United States Patent

Brennan, III et al.

(10) Patent No.: US 7,787,175 B1
(45) Date of Patent: Aug. 31, 2010

(54) PULSE SELECTING IN A CHIRPED PULSE AMPLIFICATION SYSTEM

(75) Inventors: James F. Brennan, III, Matthews, NC (US); Laurent Vaissié, Oviedo, FL (US); Michael Mielke, Orlando, FL (US); Tolga Yilmaz, Orlando, FL (US)

(73) Assignee: Raydiance, Inc., Petaluma, CA (US)

( * ) Notice: Subject to any disclaimer, the term of this patent is extended or adjusted under 35 U.S.C. 154(b) by 219 days.

(21) Appl. No.: 11/563,957

(22) Filed: Nov. 28, 2006

Related U.S. Application Data

(60) Provisional application No. 60/760,602, filed on Jan. 20, 2006.

(51) Int. Cl.
*H01S 3/10* (2006.01)
*H04B 10/17* (2006.01)

(52) U.S. Cl. .......................... 359/333; 372/25
(58) Field of Classification Search ................. 359/333; 372/25
See application file for complete search history.

(56) References Cited

U.S. PATENT DOCUMENTS

| | | | |
|---|---|---|---|
| 5,696,782 A * | 12/1997 | Harter et al. ................... 372/25 |
| 5,822,097 A | 10/1998 | Tournois | |
| 6,418,154 B1 * | 7/2002 | Kneip et al. ................... 372/25 |
| 7,143,769 B2 * | 12/2006 | Stoltz et al. .................. 128/898 |
| 7,361,171 B2 | 4/2008 | Stoltz et al. | |
| 2001/0009250 A1 * | 7/2001 | Herman et al. ......... 219/121.69 |
| 2003/0156605 A1 * | 8/2003 | Richardson et al. ........... 372/25 |
| 2004/0042061 A1 * | 3/2004 | Islam et al. .................. 359/334 |
| 2004/0134894 A1 * | 7/2004 | Gu et al. ................ 219/121.68 |
| 2004/0160995 A1 * | 8/2004 | Sauter et al. .................. 372/25 |
| 2004/0263950 A1 * | 12/2004 | Fermann et al. ............. 359/333 |
| 2005/0038487 A1 | 2/2005 | Stoltz | |
| 2005/0167405 A1 | 8/2005 | Stoltz et al. | |
| 2005/0226286 A1 * | 10/2005 | Liu et al. ...................... 372/25 |
| 2005/0265407 A1 * | 12/2005 | Braun et al. .................. 372/30 |

FOREIGN PATENT DOCUMENTS

WO    WO2004114473 A2    12/2004

* cited by examiner

*Primary Examiner*—Eric Bolda
(74) *Attorney, Agent, or Firm*—Carr & Ferrell LLP

(57) ABSTRACT

A chirped pulse amplification (CPA) system and method is described wherein a pulse selector is added after a final amplifier in the system. The pulse selector is configured to select amplified pulses such that the system output repetition rate of the CPA system is below an ASE-limiting repetition rate of the amplifiers. The system may also comprise pulse pickers placed before the final amplifier to control pulse energy of the amplified pulses.

21 Claims, 5 Drawing Sheets

PULSE SELECTING IN A CHIRPED PULSE AMPLIFICATION SYSTEM

CROSS-REFERENCE

This application claims priority to U.S. Provisional Patent Application Ser. No. 60/760,602 filed Jan. 20, 2006 and entitled "Method of Post-Power-Amplifier Pulse Selecting Ultrafast Pulse Laser System," the disclosure of which is hereby incorporated herein by reference.

BACKGROUND

Nearly all high peak power USP laser systems use the technique of chirped pulse amplification (CPA) to produce short-duration high-intensity pulses. Chirped pulse amplification increases the energy of a short pulse while avoiding optical amplifier damage. In this technique, the duration of the pulse is increased by dispersing it temporally as a function of wavelength (a process called "chirping"), amplifying the chirped pulse, and then recompressing the chirped pulse to significantly shorten its duration. By lengthening the pulse in time, energy can be efficiently extracted from an optical amplifier gain medium while the peak power levels of the pulse are below the damage threshold of the optical amplifier.

Typically, the amplifiers in a CPA system are configured to operate at an optimal repetition rate. The optimal repetition rate is often the lowest possible rate at which significant Amplified Spontaneous Emission (ASE) is prevented. The lowest rate at which ASE is prevented is referred to as the ASE-limiting rate. This rate is determined by physical properties of the amplifier, and is approximately equal to the inverse of the ASE lifetime of the gain medium. Below the ASE-limiting rate, energy within the amplifiers is lost as ASE. Above the ASE limiting rate, the amplifiers may not have time to fully recharge between pulses. Therefore, the gain of the amplifier is typically highest when the operating at the ASE-limiting rate.

SUMMARY

A pulse selector is added to a chirped pulse amplification (CPA) system to generate a system output at below an amplifier spontaneous emission (ASE)-limiting repetition rate while still operating an amplifier at the ASE-limiting rate and thus controlling the propagation of ASE. The pulse selector is configured to control the number of pulses being passed from the final amplifier to a compressor and, thus, control a system output repetition rate of the CPA system. Placing the pulse selector between a final amplifier and a pulse compressor in the CPA system controls the amount of power passing through the pulse selector and avoids component damage.

In another embodiment, the amplifier is configured to operate at a repetition rate higher than the ASE-limiting rate such that pulse energy is decreased in proportion to the higher repetition rate. In this embodiment, the repetition rate of the amplifier is optionally used to control pulse energy. The pulse selector may be used such that the repetition rate of the pulses exiting the amplifier can be changed independently of the system output repetition rate, and vice-versa.

In one embodiment, an amplifier is operated near the ASE-limiting rate to maximize a pulse energy.

The optimal repetition rate is determined according the spontaneous emission lifetime of the amplifier gain medium. In some embodiments, the optimal repetition rate is selected such that the time between pulses is equal to the spontaneous emission lifetime of the amplifier gain medium. In other embodiments, the optimal repetition rate is selected such that the time between pulses is less then one-tenth of the spontaneous emission lifetime of the gain medium. In still other embodiments, the optimal repetition rate is selected such that the time between pulses is less than one one-hundredth of the spontaneous emission lifetime of the gain medium.

Typically, the pulse selector and/or the pulse picker comprise an optical modulator. Examples of pulse modulators include an acousto-optic modulator (AOM), an electro-optic modulator (EOM), a Pockels Cell, a micro-mirror, or the like. Various embodiments include a combination of these optical modulators to control repetition rates in the CPA system.

Various embodiments of the invention include a chirped pulse amplification system comprising a pulse generator configured to generate optical pulses approximately at or above an amplified spontaneous emission-limiting repetition rate, one or more amplifiers, including a final amplifier, configured to produce amplified pulses by amplifying the optical pulses, a pulse selector configured to select a fraction of the amplified pulses to control a system output repetition rate, such that the system output repetition rate is less than the amplified spontaneous emission-limiting repetition rate, and a compressor configured to compress the fraction of the amplified pulses.

Various embodiments of the invention include a method comprising generating optical pulses approximately at or above an amplified spontaneous emission limiting repetition rate, amplifying the optical pulses to generate amplified pulses, selecting the amplified pulses using a pulse selector such that a system output repetition rate is below the amplified spontaneous emission-limiting repetition rate, to generate selected pulses having a pulse energy, and compressing the selected pulses.

DETAILED DESCRIPTION

A pulse selector is added between a final amplifier and a pulse compressor of a chirped pulse amplification (CPA) system. By selecting a fraction of the amplified pulses, amplified spontaneous emission (ASE) is controlled even though a system output repetition rate may be below an ASE-limiting rate of the amplifier gain media. Pulses are typically selected before compression, rather than after compression, to limit the amount of power being sent through the pulse selector and avoid damage to the pulse selector.

In further embodiments, the pulse energy of the amplified pulses is controlled by adjusting the repetition rate of the optical pulses before they enter the final amplifier, where the repetition rate of the optical pulses is above the ASE-limiting rate. In these embodiments, energy within the amplifier gain media is depleted by an optical pulse before the amplifier gain media is fully re-energized by one or more pump sources. Further, the pulse selector may be configured to allow all or most of the amplified pulses to pass through to the compressor.

Figure 1:
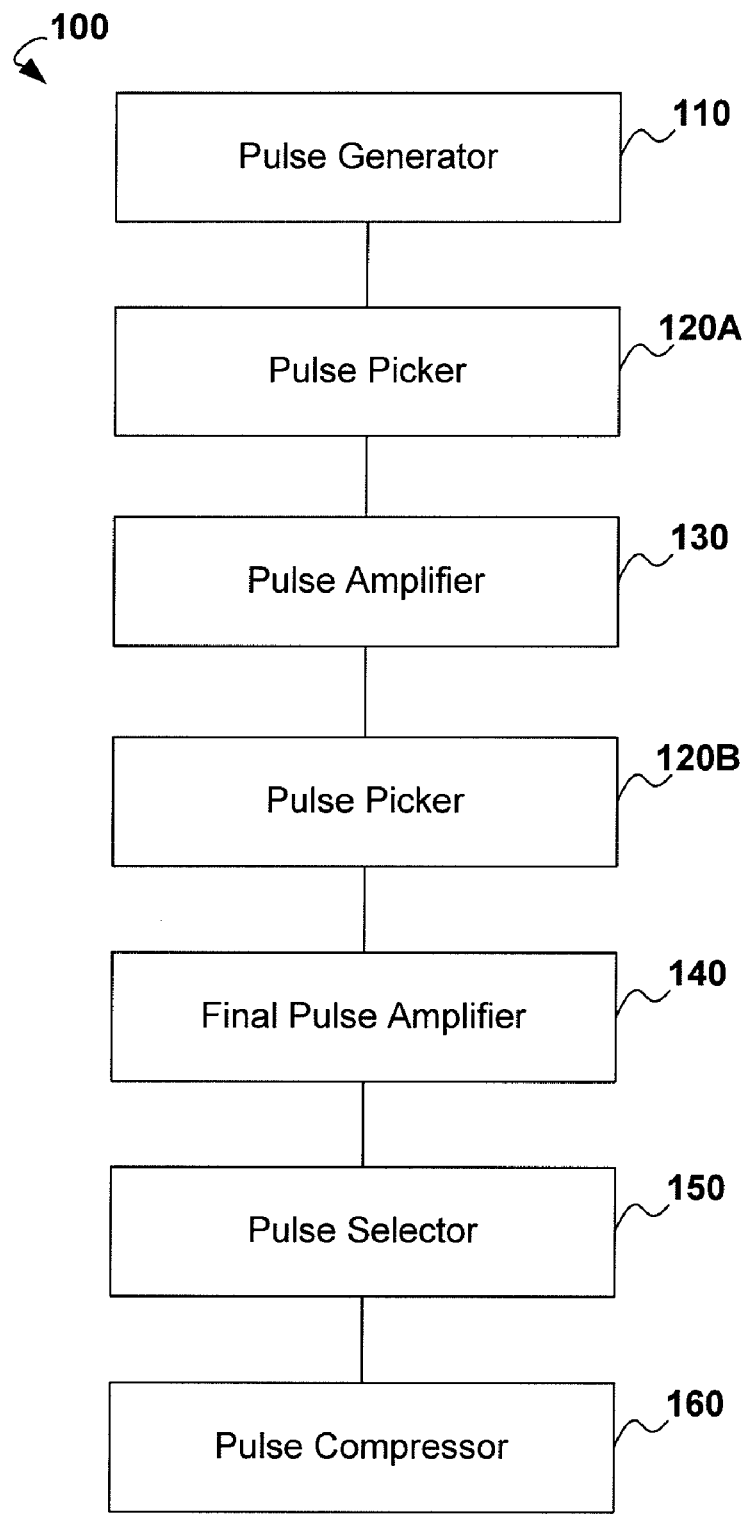
FIG. 1 is a block diagram illustrating a system included in various embodiments of the invention.

FIG. 1 illustrates a CPA system 100 configured to generate an amplified pulse. CPA system 100 includes a pulse generator 110, an optional pulse picker 120A, an optional pulse amplifier 130, a second optional pulse picker 120B, a final pulse amplifier 140, a pulse selector 150, and a pulse compressor 160.

The pulse generator 110 is configured to generate chirped optical pulses having a certain duration and repetition rate. In various embodiments, pulse generator 110 comprises, for example, a ring laser, a laser oscillator, a chirped pulse source, a quasi-continuous wave laser, or the like. To chirp the pulses, the pulse generator 110 may further comprise a pulse stretcher (not shown) configured to increase the temporal duration of the generated pulses as a function of wavelength. The pulse stretcher comprises a dispersive fiber, an acousto-optic tunable filter, a fiber Bragg grating, a Bragg fiber, a photonic crystal fiber, or the like.

The optional pulse picker 120A is included in some embodiments. The pulse picker 120A is configured to pick one or more of the optical pulses prior to amplification by optional pulse amplifier 130. The optional pulse picker 120A comprises an optical modulator such as an electro-optic modulator (EOM), an acousto-optic modulator (AOM), a Pockels Cell, a micro-mirror, a long period fiber grating, or the like.

In some embodiments, the optional pulse picker 120A, which determines the rate at which optical pulses enter an amplifier, is further configured to control the pulse energy of the amplified pulses. If the rate of the pulses is increased, the time between pulses is decreased, thus, there is less time for the amplifier gain medium to reenergize. If the gain medium of the amplifier, e.g. optional pulse amplifier 130, is not fully pumped when an optical pulse passes through, the gain in pulse energy of the optical pulses is limited by the amount of energy then present in the gain medium. In these embodiments, a desired pulse energy can be received from an operator, from an automatic table look-up, or from an analysis of an ablation plume resulting from the compressed pulse coming into contact with a material or other operational parameter.

Optional pulse amplifier 130 is configured to add energy to the optical pulse. In some embodiments, the amplifier 130 is a fiber-amplifier pumped by pump diodes. In other embodiments, the amplifier 130 is a semiconductor optical amplifier. In other embodiments, the amplifier 130 is a solid state optical amplifier, such as Nd:YAG or Yb:YAG or an amplifying medium made of mixed glasses. In some embodiments, the optional pulse amplifier 130 follows the optional pulse picker 120A.

Usually, an optimal repetition rate that is at least the ASE-limiting rate of the amplifier is determined. In certain embodiments, the optimal repetition rate is defined as the rate at which the time between optical pulses is less than one-tenth of the spontaneous emission lifetime of the gain medium. In further embodiments, the optimal repetition rate is defined as the rate at which the time between optical pulses is less than one one-hundredth of the spontaneous emission lifetime of the gain medium.

The second optional pulse picker 120B is configured to pick a fraction of the optical pulses that are then subsequently amplified. Typically, pulse picker 120B is used to decrease noise in the form of ASE in the CPA system between one or more amplifiers. In some embodiments, pulse amplifier 130 and final pulse amplifier 140 have different optimal repetition rates. Through the use of pulse picker 120B, each amplifier can be operated at different optimal repetition rates. For instance, the physical properties that affect the ASE-limiting rate of the pulse amplifier 130 and the final pulse amplifier 140 may make it desirable for the pulse amplifier 130 to be operated at a higher repetition rate than the final pulse amplifier 140. The second optional pulse picker 120B may be configured to control the pulse energy of the pulses as described herein, for example, in the discussion of optional pulse picker 120A.

The final pulse amplifier 140 is configured to amplify the optical pulses to a final pulse energy before compression, generating amplified pulses. The final pulse amplifier 140 is similar to optional pulse amplifier 130, and is a fiber-amplifier, a semiconductor optical amplifier, a solid state optical amplifier, or the like.

The pulse selector 150 is configured to select amplified pulses between final pulse amplifier 140 and pulse compressor 160, and, thus, control the repetition rate of the pulses received by the pulse compressor 160. The pulse selector 150 comprises an optical modulator such as an EOM, an AOM, a Pockels Cell, a micro-mirror, a long period fiber grating, or the like. In some embodiments, the pulse selector 150 is configured to reduce noise, in the form of ASE, in the CPA system occurring between amplified pulses. In further embodiments, the pulse selector 150 is also used to control pulse energy. Typically, the pulse selector 150 is configurable to select a fraction of the amplified pulses ranging from none of the pulses up to all of the amplified pulses. In some embodiments, the amplitude of the electrical signal used to drive the pulse selector 150 is adjusted in order to control the energy per pulse of the selected pulses and/or the system output repetition rate.

The pulse compressor 160 is configured to compress the amplified pulses that are selected by the pulse selector 150. In some embodiments, the pulse compressor 160 comprises an air-path between bulk optic gratings such as a Treacy compressor. In other embodiments, the pulse compressor 160 comprises a fiber Bragg grating, a Bragg fiber, a photonic crystal fiber, a Volume Bragg Grating, or the like. The compressed pulses are then typically delivered to a target.

Figure 2:
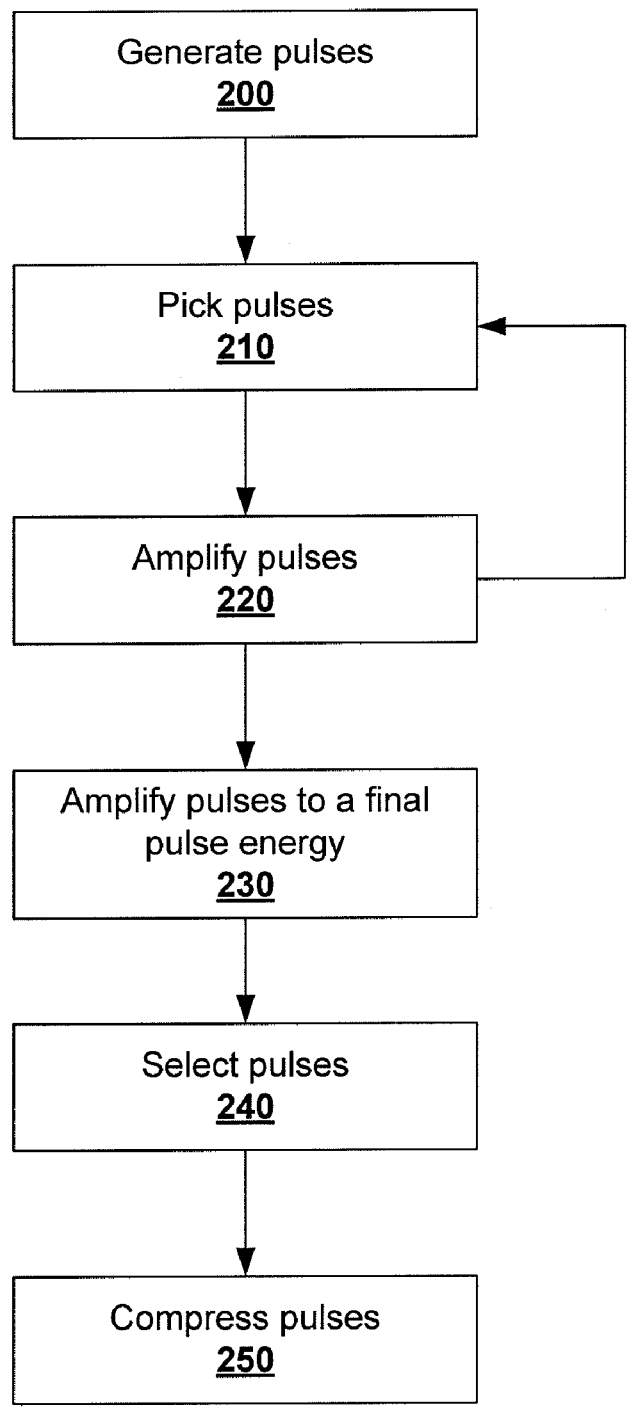
FIG. 2 is a flow chart illustrating a method included in various embodiments of the invention.

The flowchart in FIG. 2 illustrates a method used in various embodiments of the invention to control the system output repetition rate. First, step 200 includes generating chirped optical pulses using pulse generator 110. Second, optional step 210 includes picking the optical pulses using pulse pickers 120A and/or 120B. Optional step 210, pick pulses, is used to control the repetition rate of the pulses entering pulse amplifiers 130 and 140, the repetition rate being above the ASE-limiting rates corresponding to the subsequent pulse amplifier 130 and/or final pulse amplifier 140, at which pulses are amplified. The repetition rate may vary according to the ASE-limiting rates of each of the amplifiers 130 and the final pulse amplifier 140. Third, optional step 220 includes amplifying the optical pulses using, e.g. pulse amplifier 130. The pulses can be amplified and picked repeatedly before continuing on to step 230, which includes amplifying the pulses to a final pulse energy using final pulse amplifier 140. Once the pulses are amplified, step 240 includes selecting the amplified pulses such that the amplified pulses enter the pulse compressor 160 at a system output repetition rate that may be lower than the ASE-limiting rate of the final pulse amplifier 140. Finally, step 250 includes compressing the pulses.

Figure 3:
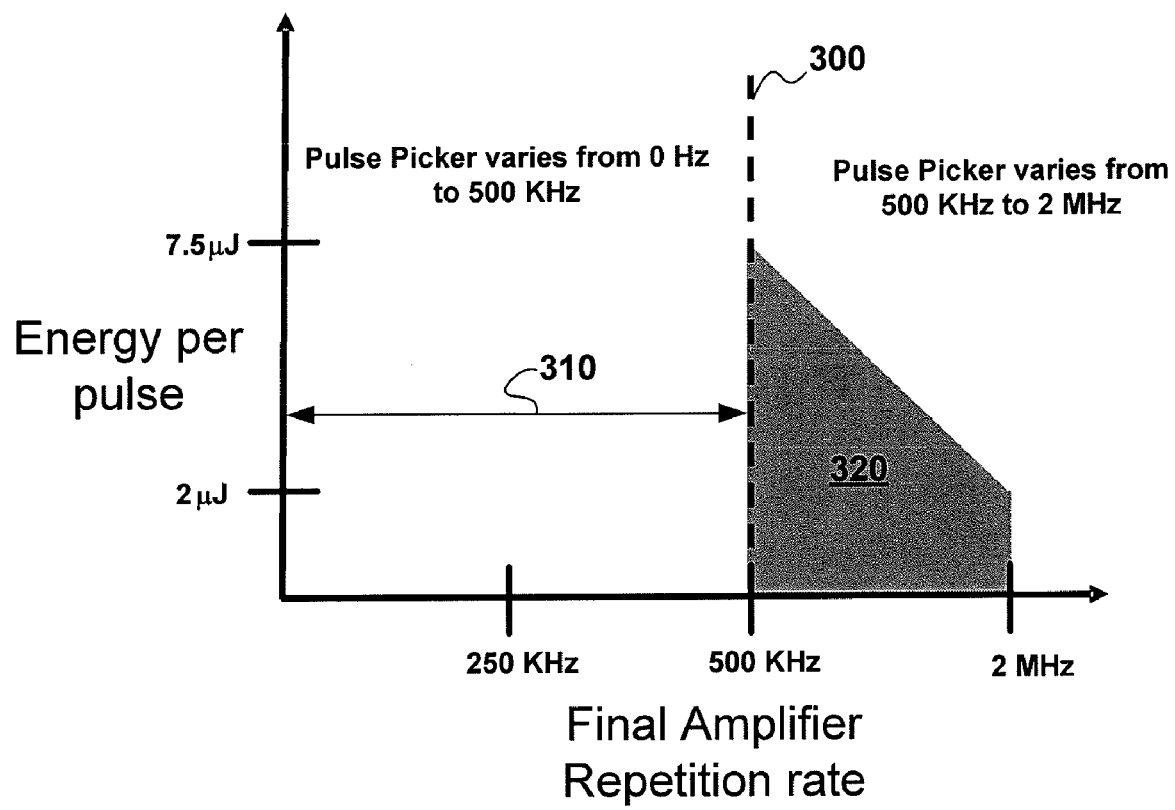
FIG. 3 is a graph illustrating the effect of the final amplifier repetition rate on the energy per pulse, according to various embodiments of the invention.

FIG. 3 illustrates the relationship between the final amplifier repetition rate and energy per pulse, according to various embodiments of the invention. This relationship may be exploited to adjust the final pulse energy because the final amplifier repetition rate is inversely proportional to the amount of energy per pulse. As the rate of the pulses passing through the final pulse amplifier 140 increases, the amount of time between pulses, during which the amplifying media recharges, decreases. With less time to recharge, the amount of energy that is stored in the amplifying media also decreases. Thus, the final amplifier repetition rate, which can be controlled by the pulse picker 120B, can be used to control the amount of energy per pulse.

For example, in one embodiment, if the ASE-limiting repetition rate of a final pulse amplifier is 500 kHz, as is depicted by dotted line 300, a maximum pulse energy of 7.5 µJ per pulse can be achieved. Typically, the final pulse amplifier 140 is not operated at frequencies below the ASE-limiting rate, range 310 in this example, to avoid introducing ASE into the CPA system. When the final pulse amplifier is operated at a repetition rate above 500 kHz, the energy per pulse is reduced from 7.5 µJ to 2 µJ as the final pulse amplifier repetition rate increases from 500 kHz to 2 MHz, indicated by area 320 to the right of the dotted line 300. Here, the pulse pickers 120A and 120B are configured to control the energy per pulse while pulse selector 150 is optionally used to keep the system output repetition rate constant. Thus, the pulse pickers 120A and 120B control the amount of energy per pulse by controlling the repetition rate at the final pulse amplifier 140.

For example, to control the amount of energy per pulse where the system output repetition rate fixed at 200 kHz, the pulse pickers 120A and 120B may be used. In these embodiments, the pulse pickers 120A and 120B are used to control the rate at which the pulses enter the pulse amplifiers 130 and 140 which, in turn, affects the pulse energy of the amplified pulses. For example, pulses picked by the pulse picker 120 entering the pulse amplifier 130 at 1 MHz may be amplified to 6 µJ while pulses picked to enter at 1.6 MHz may only be amplified to 4 µJ. Thus, the pulse pickers control the pulse energy at higher frequencies prior to entering the pulse selector 150. The pulse selector 150 may then select 20% of the amplified pulses at 1 MHz to output 6 µJ pulses at 200 kHz. Alternatively, the pulse selector may select 12.5% of the 1.6 MHz amplified pulses to output 4 µJ pulses at 200 kHz.

Figure 4:
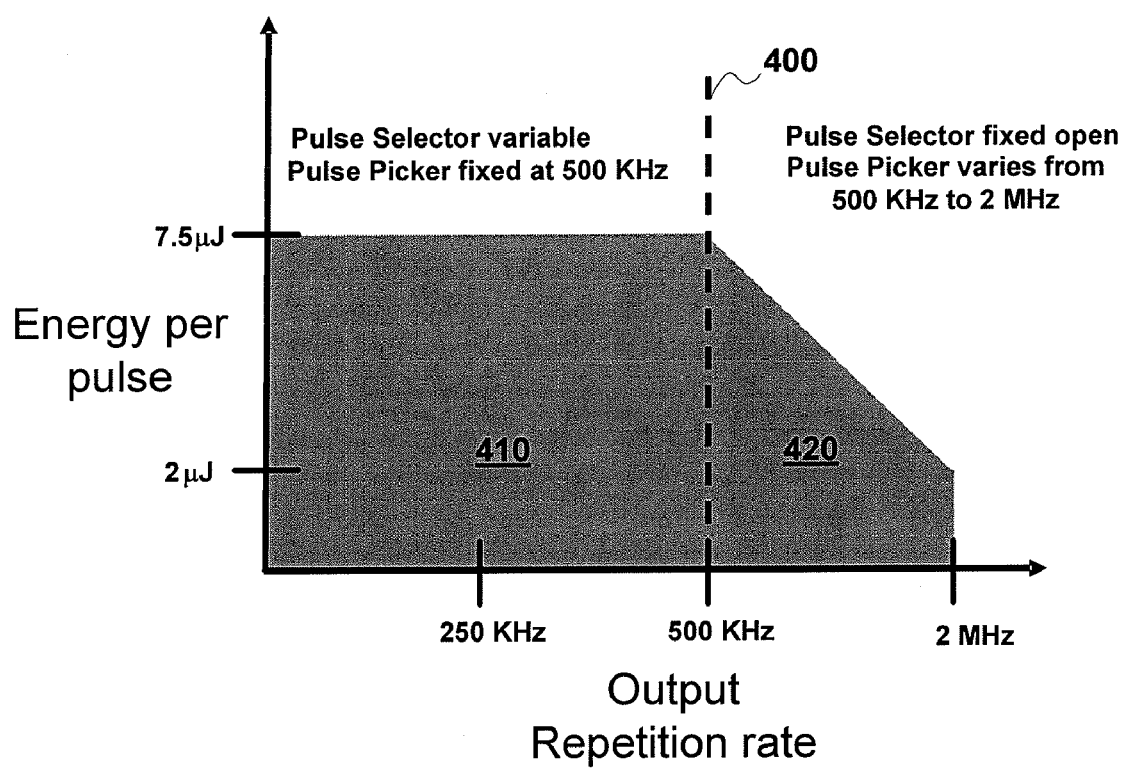
FIG. 4 is a graph illustrating the effect of the system output repetition rate on the energy per pulse according to various embodiments.

FIG. 4 illustrates the relationship between system output repetition rate and maximum energy per pulse, according to various embodiments of the invention. For example, in one embodiment, if the ASE-limiting repetition rate of a final pulse amplifier is 500 kHz, as is depicted by dotted line 400, up to 7.5 µJ per pulse can be maintained. If the system output rate is below 500 kHz, 7.5 µJ is the maximum pulse energy that can be delivered by the system, depicted by area 410. In the system output repetition rate range represented by area 410, the pulse pickers 120A and/or 120B in the system may be fixed at the ASE-limiting repetition rates of the pulse amplifiers 134 and 140 while the pulse selector 150 controls the number of pulses to be compressed and generated as system output. Thus, at system output repetition rates below the ASE-limiting repetition rate, the energy per pulse may be controlled independently of the repetition rate of the output in the system.

Alternatively, at rates higher than the ASE-limiting repetition rate, the pulse amplifiers 134 and 140 may be operated at a higher repetition rate while producing lower energy pulses. The system output rate and pulse energy can be controlled by changing the rate at which the pulse amplifiers 130 and 140 operate. In this example, the energy per pulse is reduced from 7.5 µJ to 2 µJ as the system output repetition rate increases from 500 kHz to 2 MHz, indicated by area 420 to the right of the dotted line 400. Here, the pulse pickers 120A and 120B are configured to produce a high system output repetition rate resulting in a lower maximum amount of energy per pulse.

Figure 5A:
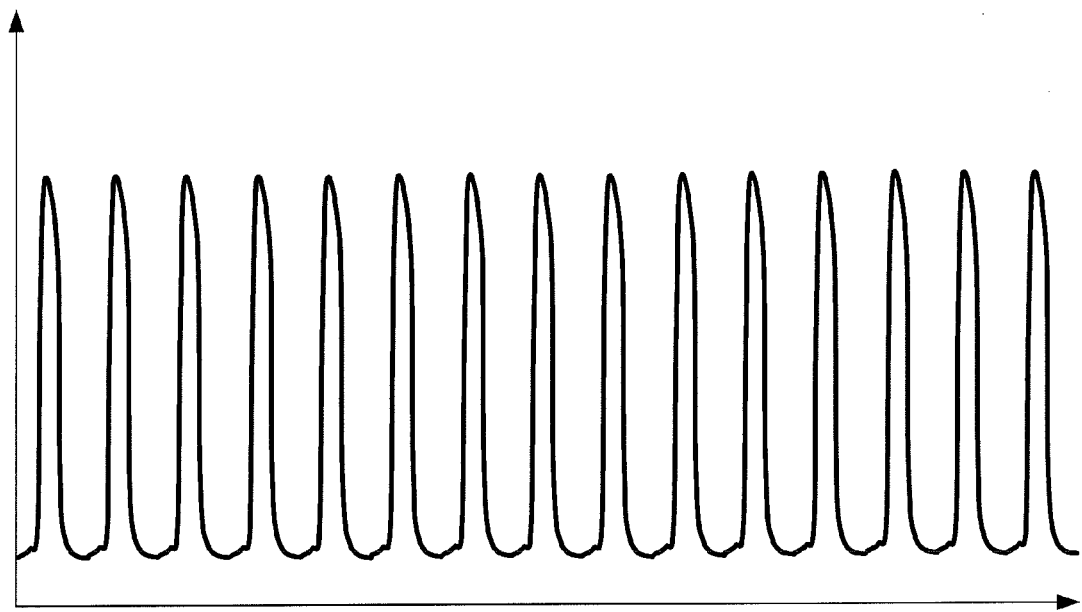
FIG. 5A is a graph illustrating a pulse train prior to entering the pulse selector, according to various embodiments of the invention.
Figure 5B:
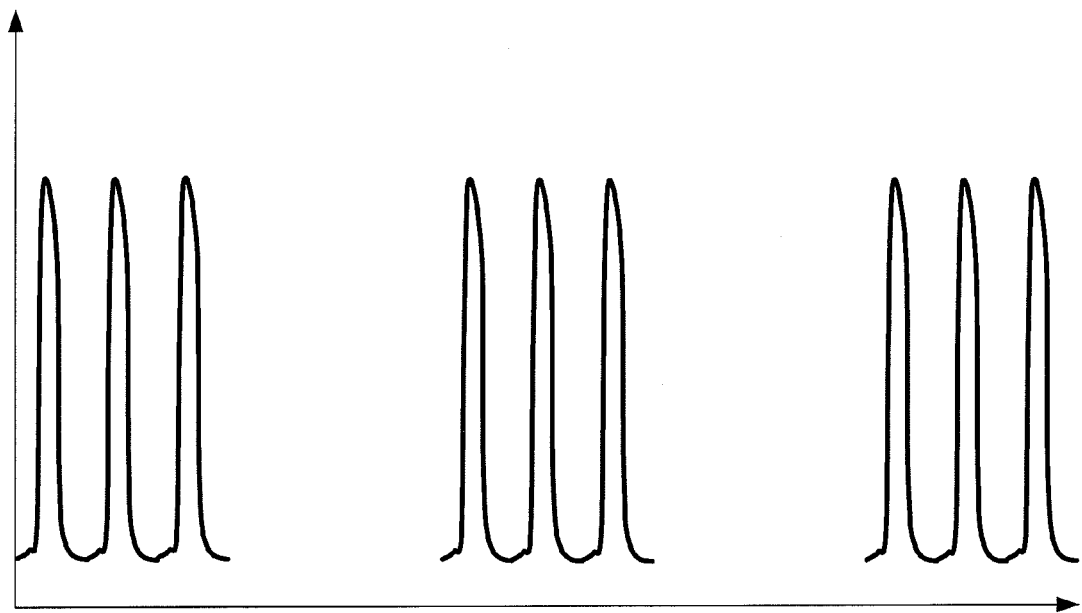
FIG. 5B is a graph illustrating the pulse train of FIG. 5A after passing through the pulse selector in burst mode, according to various embodiments of the invention.

FIG. 5A is a graph illustrating a pulse train prior to entering the pulse selector 150 according to various embodiments of the invention. The widths of pulses and their separation may not be to scale. FIG. 5B is a graph illustrating the pulse train of FIG. 5A after passing through the pulse selector 150 in a burst mode according to various embodiments of the invention. In some embodiments, a packet of pulses are selected by the pulse selector 150 in order for the system to operate in a "burst mode." In this mode of operation, each packet of selected pulses is separated from another packet by a fixed or variable amount of time controlled by the pulse selector 150. The period between two pulses from within the packet of selected pulses is controlled by the pulse selector 150 by selecting out intervening pulses. Optionally, burst mode operation can be used in the pulse generator 110 before amplification. In some embodiments, the pulse generator 110 or the pulse pickers 120A and 120B may control the time delay between the pulses of a packet during burst mode operation rather than the pulse selector 150.

As used herein, the term "pulse energy" is the energy of a single pulse and is synonymous with the term "energy per pulse."

Several embodiments are specifically illustrated and/or described herein. However, it will be appreciated that modifications and variations are covered by the above teachings and within the scope of the appended claims without departing from the spirit and intended scope thereof. For example, in some embodiments, the pulse pickers are used in conjunction with the pulse selector as described herein to generate low energy, low frequency pulses. Some embodiments further comprise more than one amplifier and/or more than one pulse picker. In other embodiments, pulse amplifiers or pulse compressors are configured in parallel. In one embodiment, pulse selector 150 and/or compressor 160 are configured to receive pulses from a plurality of parallel pulse amplifiers.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A chirped pulse amplification system, comprising:
   one or more amplifiers, including a final amplifier, configured to produce amplified pulses by amplifying optical pulses;
   a pulse generator configured to generate the optical pulses approximately at or above an amplified spontaneous emission-limiting repetition rate as determined by physical properties of at least one of the one or more amplifiers;
   a pulse selector configured to select a fraction of the amplified pulses to control a system output repetition rate, such that the system output repetition rate is less than the amplified spontaneous emission-limiting repetition rate, wherein the pulse selector is configured to control an energy per pulse and a pulse repetition rate, wherein the energy per pulse is controlled independently from the pulse repetition rate by the pulse selector; and a compressor configured to compress the fraction of the amplified pulses.

2. The system of claim 1, wherein the pulse selector comprises an optical modulator selected from a group consisting of an acousto-optic modulator, an electro-optic modulator, a Pockels Cell, a micro-mirror, and a long period fiber grating.

3. The system of claim 1, wherein a time between the amplified pulses is shorter than one-tenth of a spontaneous emission lifetime of a gain medium of at least one of the one or more amplifiers.

4. The system of claim 1, wherein a time between the amplified pulses is shorter than one one-hundredth of a spontaneous emission lifetime of a gain medium of at least one of the one or more amplifiers.

5. The system of claim 1, further comprising a pulse picker configured to select a fraction of the optical pulses prior to amplification by the final amplifier.

6. The system of claim 5, wherein the pulse picker comprises an optical modulator selected from a group consisting of an acousto-optic modulator, an electro-optic modulator, a Pockels Cell, and a micro-mirror.

7. The system of claim 5, wherein the pulse picker is configured to control the system output repetition rate and the pulse selector selects substantially all of the amplified pulses.

8. The system of claim 5, wherein the pulse picker is further configured to control a pulse energy of the amplified pulses.

9. The system of claim 5, wherein the pulse picker is further configured to control a pulse energy of the amplified pulses independent of the system output repetition rate.

10. The system of claim 5, wherein the pulse selector is configured to maintain a constant system output repetition rate while a pulse energy of the amplified pulses is varied using the pulse picker.

11. The system of claim 1, wherein the pulse selector is configured to select less than ninety percent of the amplified pulses.

12. The system of claim 1, wherein the pulse selector is configured to operate in a burst mode.

13. A method comprising:
amplifying optical pulses to generate amplified pulses using an amplifier;
generating the optical pulses approximately at or above an amplified spontaneous emission-limiting repetition rate as determined by physical properties of the amplifier;
amplifying the optical pulses to generate amplified pulses;
selecting the amplified pulses using a pulse selector such that a system output repetition rate is below the amplified spontaneous emission-limiting repetition rate, to generate selected pulses having a pulse energy, wherein the pulse selector is configured to control an energy per pulse and a pulse repetition rate, wherein the energy pulse is controlled independently from the pulse repetition rate by the pulse selector; and
compressing the selected pulses.

14. The method of claim 13, further comprising amplifying the optical pulses such that a time between the amplified pulses is shorter than one-tenth of a spontaneous emission lifetime of a gain medium of the amplifier.

15. The method of claim 13, further comprising amplifying the optical pulses such that a time between the amplified pulses is shorter than one one-hundredth of a spontaneous emission lifetime of a gain medium of the amplifier.

16. The method of claim 13, further comprising varying an amplifier repetition rate to control the pulse energy.

17. The method of claim 13, wherein the amplified pulses are generated using a final amplifier.

18. The method of claim 13, further comprising picking the optical pulses such that an amplifier repetition rate is near the amplified spontaneous emission-limiting rate.

19. The method of claim 13, further comprising maintaining a constant system output repetition rate while a pulse energy of the amplified pulses is varied using a pulse picker.

20. The method of claim 13, further comprising picking the optical pulses to control a pulse energy of the amplified pulses independent of the system output repetition rate.

21. The method of claim 13, further comprising selecting packets of the amplified pulses, the packets separated by an amount of time.

* * * * *